US009171539B2

(12) United States Patent
Funyak et al.

(10) Patent No.: US 9,171,539 B2
(45) Date of Patent: *Oct. 27, 2015

(54) TRANSFORMING COMPONENTS OF A WEB PAGE TO VOICE PROMPTS

(71) Applicant: Vocollect, Inc., Pittsburgh, PA (US)

(72) Inventors: Paul M. Funyak, West Miffin, PA (US); Norman J. Connors, Monroeville, PA (US); Paul E. Kolonay, Pittsburgh, PA (US); Matthew Aaron Nichols, Plttsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,280

(22) Filed: Mar. 26, 2015

(65) Prior Publication Data
US 2015/0199957 A1    Jul. 16, 2015

Related U.S. Application Data

(63) Continuation of application No. 12/609,564, filed on Oct. 30, 2009, now Pat. No. 8,996,384.

(51) Int. Cl.
| *G10L 13/00* | (2006.01) |
| *G10L 13/08* | (2013.01) |
| *G10L 21/00* | (2013.01) |
| *G10L 13/02* | (2013.01) |
| *G06F 17/22* | (2006.01) |
| *G10L 15/22* | (2006.01) |

(52) U.S. Cl.
CPC ............ *G10L 13/02* (2013.01); *G06F 17/2247* (2013.01); *G10L 15/22* (2013.01)

(58) Field of Classification Search
USPC .............. 704/258–269, 270, 270.1, 271–278, 704/E21.001–E21.02, E11.001–E11.007, 704/E13.001–E13.014; 382/103, 114, 382/181–182; 709/201–203, 212–222, 709/230–244
See application file for complete search history.

(56) References Cited

U.S. PATENT DOCUMENTS

| 5,864,814 | A | * | 1/1999 | Yamazaki | ................... | 704/270.1 |
| 5,915,001 | A | * | 6/1999 | Uppaluru | ................... | 379/88.22 |
| 6,018,710 | A | * | 1/2000 | Wynblatt et al. | ............. | 704/260 |
| 6,115,686 | A | * | 9/2000 | Chung et al. | .................. | 704/260 |
| 6,282,511 | B1 | * | 8/2001 | Mayer | .......................... | 704/270 |
| 6,397,183 | B1 | * | 5/2002 | Baba et al. | ..................... | 704/260 |
| 6,507,817 | B1 | * | 1/2003 | Wolfe et al. | .................. | 704/260 |
| 6,510,417 | B1 | * | 1/2003 | Quilici et al. | ................ | 704/275 |
| 6,578,000 | B1 | * | 6/2003 | Dodrill et al. | ................ | 704/270 |
| 6,601,057 | B1 | * | 7/2003 | Underwood et al. | ......... | 715/207 |

(Continued)

*Primary Examiner* — Pierre-Louis Desir
*Assistant Examiner* — David Kovacek
(74) *Attorney, Agent, or Firm* — Additon, Higgins & Pendleton, P.A.

(57) ABSTRACT

Embodiments of the invention address the deficiencies of the prior art by providing a method, apparatus, and program product to of converting components of a web page to voice prompts for a user. In some embodiments, the method comprises selectively determining at least one HTML component from a plurality of HTML components of a web page to transform into a voice prompt for a mobile system based upon a voice attribute file associated with the web page. The method further comprises transforming the at least one HTML component into parameterized data suitable for use by the mobile system based upon at least a portion of the voice attribute file associated with the at least one HTML component and transmitting the parameterized data to the mobile system.

20 Claims, 5 Drawing Sheets

(56) References Cited

U.S. PATENT DOCUMENTS

| | | | |
|---|---|---|---|
| 6,711,618 B1* | 3/2004 | Danner et al. | 709/228 |
| 6,728,934 B1* | 4/2004 | Scopes | 715/205 |
| 6,738,803 B1* | 5/2004 | Dodrill et al. | 709/218 |
| 6,766,298 B1* | 7/2004 | Ravishankar et al. | 704/270.1 |
| 6,847,999 B1* | 1/2005 | Dodrill et al. | 709/225 |
| 6,952,800 B1* | 10/2005 | Danner et al. | 715/234 |
| 7,016,845 B2* | 3/2006 | Vora et al. | 704/270.1 |
| 7,185,276 B2* | 2/2007 | Keswa | 715/239 |
| 7,197,462 B2* | 3/2007 | Takagi et al. | 704/275 |
| 7,295,984 B2* | 11/2007 | Glynn | 704/270.1 |
| 7,317,787 B2* | 1/2008 | Crockett et al. | 379/88.03 |
| 7,359,858 B2* | 4/2008 | Gong et al. | 704/257 |
| 7,451,081 B1* | 11/2008 | Gajic et al. | 704/231 |
| 7,685,252 B1* | 3/2010 | Maes et al. | 709/217 |
| 8,140,340 B2* | 3/2012 | Bhogal et al. | 704/273 |
| 8,150,695 B1* | 4/2012 | Killalea et al. | 704/270 |
| 2002/0002461 A1* | 1/2002 | Tetsumoto | 704/270.1 |
| 2002/0062216 A1* | 5/2002 | Guenther et al. | 704/270.1 |
| 2002/0184004 A1* | 12/2002 | Shizuka et al. | 704/200 |
| 2003/0046316 A1* | 3/2003 | Gergic et al. | 707/513 |
| 2003/0078993 A1* | 4/2003 | Hull et al. | 709/219 |
| 2003/0120593 A1* | 6/2003 | Bansal et al. | 705/39 |
| 2003/0139928 A1* | 7/2003 | Krupatkin et al. | 704/260 |
| 2003/0195751 A1* | 10/2003 | Schwenke et al. | 704/270.1 |
| 2004/0006471 A1* | 1/2004 | Chiu | 704/260 |
| 2004/0073431 A1* | 4/2004 | Galanes et al. | 704/270.1 |
| 2004/0125794 A1* | 7/2004 | Marquette et al. | 370/355 |
| 2004/0128136 A1* | 7/2004 | Irani | 704/270.1 |
| 2005/0065795 A1* | 3/2005 | Mutsuno et al. | 704/260 |
| 2005/0144002 A1* | 6/2005 | Ps | 704/266 |
| 2005/0198300 A1* | 9/2005 | Gong et al. | 709/227 |
| 2005/0234727 A1* | 10/2005 | Chiu | 704/270.1 |
| 2006/0074683 A1* | 4/2006 | Betarbet | 704/270.1 |
| 2007/0233495 A1* | 10/2007 | Agapi et al. | 704/270 |
| 2007/0280216 A1* | 12/2007 | Sabat et al. | 370/356 |
| 2008/0059189 A1* | 3/2008 | Stephens | 704/258 |
| 2008/0126095 A1* | 5/2008 | Sideman | 704/260 |
| 2008/0208591 A1* | 8/2008 | Ativanichayaphong et al. | 704/275 |
| 2011/0106537 A1* | 5/2011 | Funyak et al. | 704/260 |

* cited by examiner

TRANSFORMING COMPONENTS OF A WEB PAGE TO VOICE PROMPTS

CROSS-REFERENCE TO RELATED APPLICATION

The present application claims the benefit of U.S. patent application Ser. No. 12/609,564 for Transforming Components of a Web Page to Voice Prompts filed Oct. 30, 2009 (and published May 5, 2011 as U.S. Patent Application Publication No. 2011/0106537), now U.S. Pat. No. 8,996,384. International Application No. PCT/US10/53937 for Transforming Components of a Web Page to Voice Prompts filed Oct. 25, 2010 (and published May 5, 2011 as WIPO Publication No. WO 2011/053549) also claims the benefit of U.S. patent application Ser. No. 12/609,564. Each of the foregoing patent applications, patent publications, and patent is hereby incorporated by reference in its entirety.

FIELD OF THE INVENTION

Embodiments of the invention relate to a voice-based user interface for interacting with a web page.

BACKGROUND

Stored data or information is generally structured to be accessed using an interface of a particular type. For example, web pages are generally structured using a markup language, such as the hypertext markup language (HTML). These web pages generally include HTML components that specify what type of HTML is displayed. The HTML components can include text boxes, buttons, tables, fields thereof, selectable links, and generally any type of HTML component that can be displayed by an internet browser.

Thus, some web pages utilize interactable components. Although these interactable web pages are typically accessed using a screen-based interface in a client-server arrangement, problems often arise when there is no screen-based interface, such as when there is only an audio interface to interact with those web pages. Many conventional voice systems used to access web pages are unable to interact with interactable components thereof, and instead are often limited to reading the text of only those web page already specified by users. Therefore, many conventional voice systems are unable to fully utilize web pages, and in particular web pages that are used to control a process or workflow.

SUMMARY

Embodiments of the invention address the deficiencies of the prior art by providing a method, apparatus, and program product for converting user of a web page, such as user interface components of the web page, to voice prompts for a user. In some embodiments, the method comprises selectively determining at least one HTML component from a plurality of HTML components of a web page to transform into a voice prompt for a mobile system based upon a voice attribute file associated with the web page. The method further comprises transforming the at least one HTML component into parameterized data suitable for use by the mobile system based upon at least a portion of the voice attribute file associated with the at least one HTML component and transmitting the parameterized data to the mobile system.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Hardware and Software Environment

Figure 1:
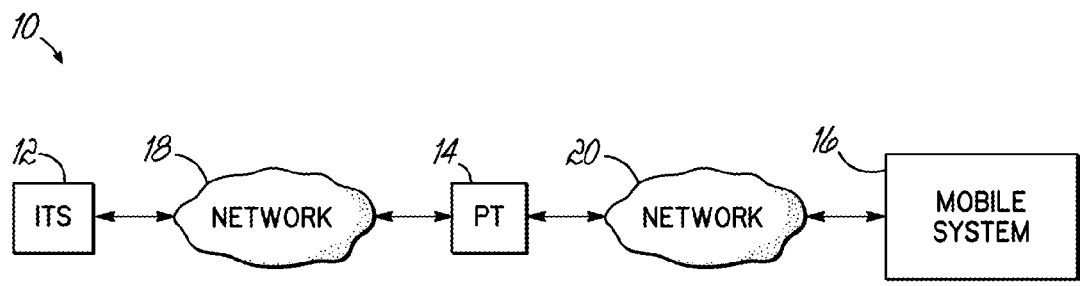
FIG. 1 is a diagrammatic illustration of a system that includes an internet transaction server, a protocol translator, and a mobile system consistent with embodiments of the invention.

Turning now to the drawings, wherein like numbers denote like parts throughout the drawings, FIG. 1 is a diagrammatic illustration of a protocol translation system 10 consistent with embodiments of the invention. The system 10 includes an Internet Transaction Server 12 (illustrated as, and hereinafter, "ITS" 12), a protocol translator 14 (illustrated as "PT" 14), and a mobile system 16. The ITS 12 is configured to provide web pages that include hyper text markup language (HTML) code to the protocol translator 14 through a first at least one network 18 (or, for the sake of brevity, "first" network 18). In specific embodiments, the ITS 12 is configured to provide web pages to the protocol translator 14 that are part of a work flow for a user (e.g., such as a work flow for a warehouse pick system, a medical facility care system, an order implementation system). As such, each web page may include a unique identifier associated therewith as well as various HTML components (e.g., including buttons, text, tables, fields thereof, selectable links). The protocol translator 14 is configured to determine, based upon the unique identifier, a voice attribute file to utilize to transform at least some of the HTML components into parameterized components which are provided, in a comma delimited string, to the mobile system 16. In some embodiments, the protocol translator 14 is further configured to generate parameterized components based solely upon the voice attribute file, the generated parameterized components otherwise not associated with corresponding HTML components of a web page. The protocol translator 14 provides the parameterized components to the mobile system 16 across a second at least one network 20 (or, for the sake of brevity, "second" network 20). In some embodiments, the ITS 12 is an SAP ITS as distributed by SAP America, Inc., of Newtown Square, Pa. It will be appreciated that the first and/or second network 18 and/or 20 include at least one private communications network (e.g., such as an intranet) and/or at least one public communications network (e.g., such as the Internet). Furthermore, it will be appreciated that the illustrations of the first and second network 18 and 20 are merely illustrative, and that the ITS 12, protocol translator 14, and mobile system 16 may be interconnected through one or more common networks.

The protocol translator 14 is configured to selectively determine at least one HTML component from a web page to transform into a parameterized component based on the voice attribute file (e.g., the protocol translator 14 is configured to "scrape" the web page for at least one HTML component to transform to a parameterized component based on the voice attribute file). The protocol translator 14 is further configured to "scrape" at least some data from the HTML component (e.g., part of a URL associated therewith, text associated therewith, a function associated therewith), compare it to a corresponding portion of the voice attribute file (e.g., a voice attribute component of the voice attribute file that matches the HTML component), and create a parameterized component that includes at least some of the scraped data as well as at least some of data from the voice attribute component associated therewith. The protocol translator 14 then provides parameterized components to the mobile system 16. The mobile system 16, in specific embodiments, is a voice direct and/or voice assist system that is configured to transform a parameterized component into a speech dialog, or "voice prompt," for a user thereof, as well as capture speech input from the user and convert to machine readable input. As such, the protocol translator 14 is further configured to receive a message from the mobile system 16 (which may include the speech input of the user converted into the machine readable input), decode the message into a uniform resource locator (URL) or web address, then provide that URL to the ITS 12. In this manner, the protocol translator 14 is configured as an interface between a web page and a voice recognition system that can change the interaction therebetween by adjusting voice attribute files associated therewith.

Figure 2:
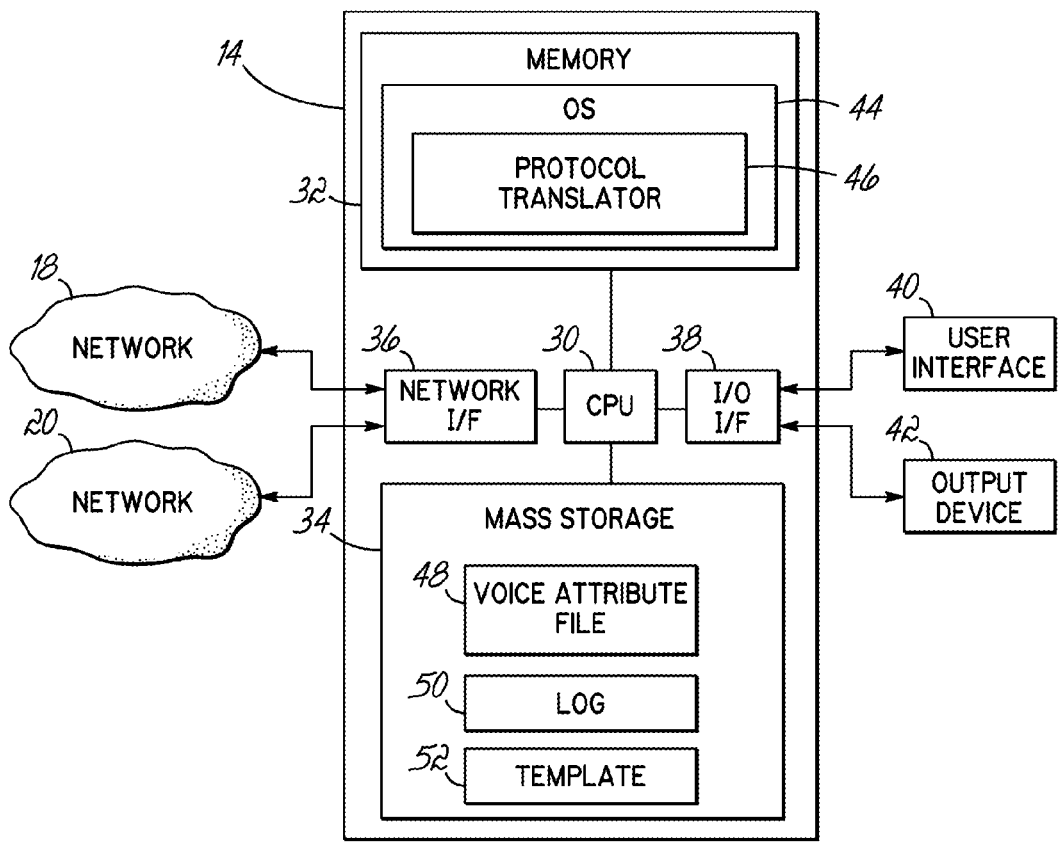
FIG. 2 is a diagrammatic illustration of hardware and software components of the protocol translator of FIG. 1.

FIG. 2 is a diagrammatic illustration of a protocol translator 14 consistent with embodiments of the invention. In specific embodiments, the protocol translator 14 is a computer, computing system, computing device, server, disk array, or programmable device such as a multi-user computer, a single-user computer, a handheld computing device, a networked device (including a computer in a cluster configuration), a mobile telecommunications device, a video game console (or other gaming system), etc. As such, the protocol translator 14 includes at least one central processing unit (CPU) 30 coupled to a memory 32. Each CPU 30 is typically implemented in hardware using circuit logic disposed on one or more physical integrated circuit devices or chips. Each CPU 30 may be one or more microprocessors, micro-controllers, field programmable gate arrays, or ASICs, while memory 32 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 32 may be considered to include memory storage physically located elsewhere in the protocol translator 14, e.g., any cache memory in the at least one CPU 30, as well as any storage capacity used as a virtual memory, e.g., as stored on a mass storage device 34, another computing system, a network storage device (e.g., a tape drive), or another network device (e.g., a server) coupled to the protocol translator 14 through at least one network interface 36 (illustrated as, and hereinafter, "network I/F" 36) by way of the first and/or second network 18 and/or 20.

The protocol translator 14 is coupled to at least one peripheral device through an input/output device interface 38 (illustrated as, and hereinafter, "I/O I/F" 38). In particular, the protocol translator 14 receives data from a user through at least one user interface 40 (including, for example, a keyboard, mouse, a microphone, and/or other user interface) and/or outputs data to the user through at least one output device 42 (including, for example, a display, speakers, a printer, and/or another output device). Moreover, in some embodiments, the I/O I/F 38 communicates with a device that is operative as a user interface 40 and output device 42 in combination, such as a touch screen display (not shown).

The protocol translator 14 is typically under the control of an operating system 44 and executes or otherwise relies upon various computer software applications, sequences of operations, components, programs, files, objects, modules, etc., consistent with embodiments of the invention. In specific embodiments, the protocol translator 14 executes or otherwise relies on a protocol translator application 46 to manage translation of HTML components into parameterized components consistent with embodiments of the invention. The mass storage 34 of the protocol translator 14 includes a voice attribute file data structure 48, a log data structure 50, and a parsed data data structure 52 to store at least one respective voice attribute file, log, and parsed data.

The protocol translator 14 is configured to parse a web page, store that parsed data in the parsed data data structure 52, and determine a unique identifier associated with that web page. The protocol translator 14 is further configured to determine which voice attribute file from a plurality of voice attribute files in the voice attribute file data structure 48 is associated with the web page based upon the unique identifier. The protocol translator 14 then scrapes the web page and transforms at least one HTML component thereof into a parameterized component based on the determined attribute file. The protocol translator then provides that parameterized component to the mobile system 16. In some embodiments, the unique identifier is a unique identifier of a particular template used to create the web page, while in alternative embodiments the unique identifier is the unique URL associated with the web page.

Figure 3:
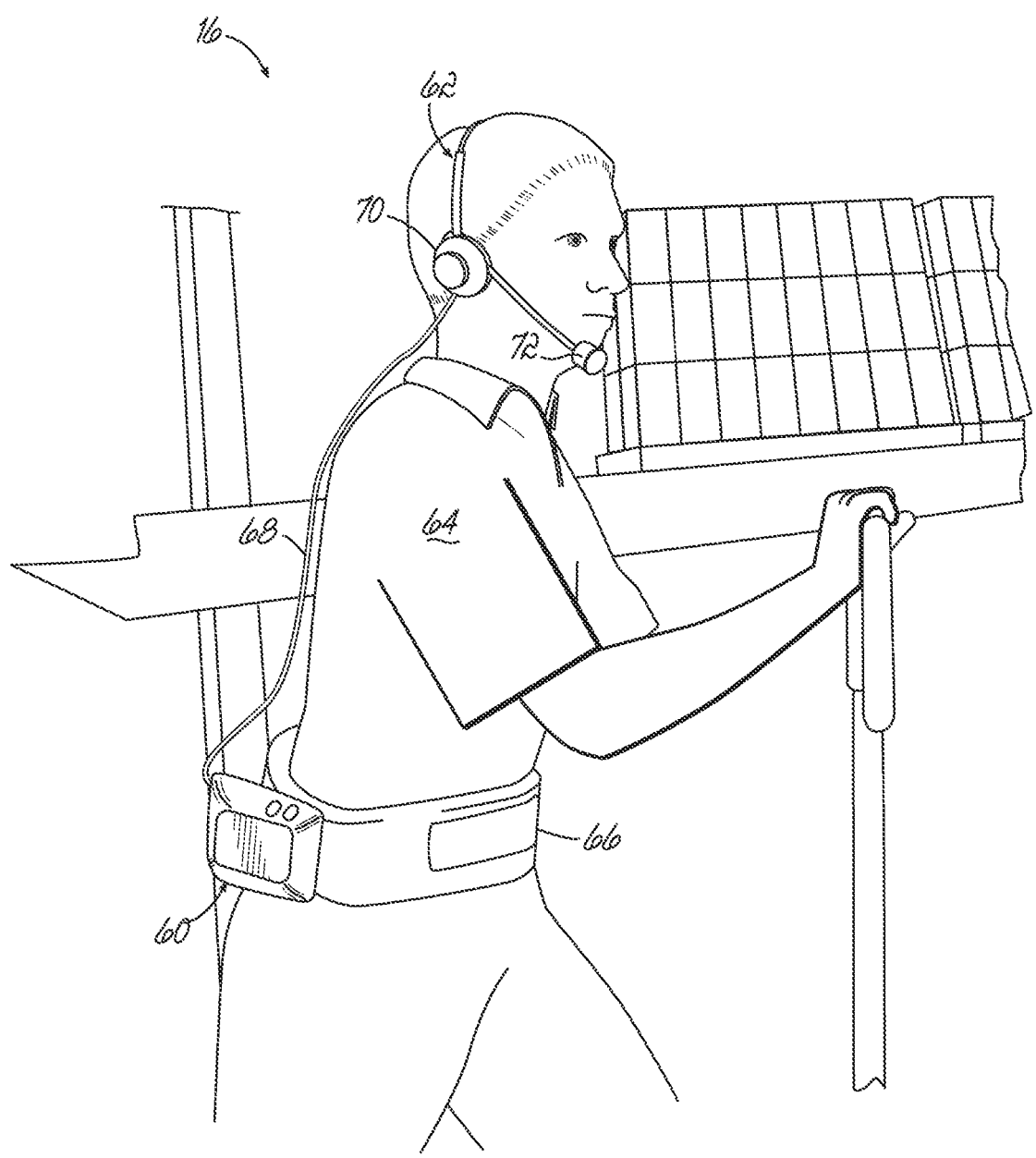
FIG. 3 is an illustration of the mobile system of FIG. 1 further illustrating a mobile device and headset thereof.

The mobile system 16 is configured to receive at least one parameterized component in the form of a comma delimited string and output a corresponding speech dialog, or a corresponding voice prompt, to its user. The user may then provide speech input to interact with the web page. FIG. 3 is an illustration of a mobile system 16 consistent with embodiments of the invention. Specifically, the mobile system 16 includes a portable and/or wearable computer or device 60 (hereinafter, "mobile device" 60) and a peripheral device or headset 62 (hereinafter, "headset" 62). As illustrated in FIG. 3, the mobile device 60 is a wearable device worn by a user 64 on a belt 66. In alternative embodiments, the mobile device 60 is carried or otherwise transported, such as on a lift truck, harness, or other manner of transportation.

In some embodiments, the user 64 interfaces with the mobile device 60 (and the mobile device 60 interfaces with the user 64) through the headset 62, which is coupled to the mobile device 60 through a cord 68. In alternative embodiments, the headset 62 is a wireless headset and coupled to the mobile device 60 through a wireless signal (not shown). Specifically, the headset 62 includes a speaker 70 and a microphone 72. The speaker 70 is configured to play audio (e.g., such as to instruct the user 64 to perform an action), while the microphone 72 is configured to capture speech input from the user 64 (e.g., such as for conversion to machine readable input by the mobile device 60). As such, and in some embodiments, the user 64 interfaces with the mobile device 60 hands-free through the headset 62.

Figure 4:
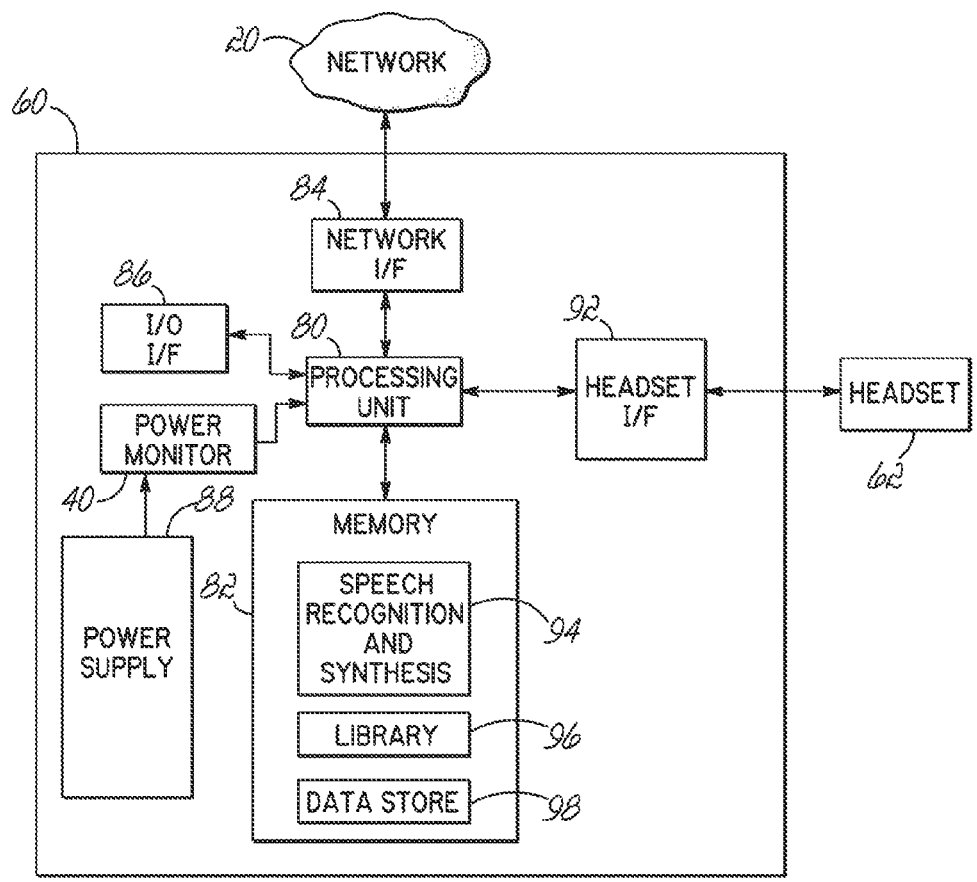
FIG. 4 is a diagrammatic illustration of hardware and software components of the mobile device and headset of FIG. 3.

FIG. 4 is a diagrammatic illustration of at least a portion of the components of the mobile device 60 consistent with embodiments of the invention. The mobile device 60 includes at least one processing unit 80 coupled to a memory 82. Each processing unit 80 is typically implemented in hardware using circuit logic disposed in one or more physical integrated circuit devices, or chips. Each processing unit 80 may be one or more microprocessors, micro-controllers, field programmable gate arrays, or ASICs, while memory 82 may include RAM, DRAM, SRAM, flash memory, and/or another digital storage medium, and that is also typically implemented using circuit logic disposed in one or more physical integrated circuit devices, or chips. As such, memory 82 is considered to include memory storage physically located elsewhere in the mobile device 60, e.g., any cache memory in the at least one processing unit 80, as well as any storage capacity used as a virtual memory, e.g., as stored on a mass storage device, a computer, and/or or another device coupled to the mobile device 60, including coupled to the mobile device 60 through at least one network interface 84 (illustrated as, and hereinafter, "network I/F" 84) by way of the second network 20. The mobile device 60, in turn, couples to the second network 20 through the network I/F 84 with at least one wired and/or wireless connection. In specific embodiments, the mobile device 60 couples to the second network 20 through an IEEE 802 standard, and in particular an IEEE 802.11 wireless communications standard as is known in the art.

In some embodiments, the mobile device 60 additionally includes at least one input/output interface 86 (illustrated as, and hereinafter, "I/O I/F" 86) configured to communicate with at least one peripheral other than the headset 62. Such a peripheral may include at least one of one or more training devices (e.g., to coach a new user through training to use the mobile device 60, headset 62, and/or a system to which they are coupled), image scanners, barcode readers, RFID readers, monitors, printer s, and/or other peripherals (none shown). In specific embodiments, the I/O I/F 86 includes at least one peripheral interface, including at least one of one or more serial, universal serial bus (USB), PC Card, VGA, HDMI, DVI, and/or other interfaces (e.g., for example, other computer, communicative, data, audio, and/or visual interfaces) (none shown). The mobile device 60 also includes a power supply 88, such as a battery, rechargeable battery, rectifier, and/or other power source. The mobile device 60 monitors the voltage from the power supply 88 with a power monitoring circuit 90. In some embodiments, and in response to the power monitoring circuit 90 determining that the power from the power supply 88 is insufficient, the mobile device 60 shuts down to prevent potential damage. The mobile device 60 is configured to communicate with the headset 62 through a headset interface 92 (illustrated as, and hereinafter, "headset I/F" 92), which is in turn configured to couple to the headset 62 through the cord 68 and/or wirelessly.

The mobile device 60 may be under the control and/or otherwise rely upon various software applications, components, programs, files, objects, modules, etc. (hereinafter, "program code") consistent with embodiments of the invention. This program code may include an operating system (e.g., such as a Windows Embedded Compact operating system as distributed by Microsoft Corporation of Redmond, Wash.) (not shown) as well as one or more software applications (e.g., configured to operate in an operating system or as "stand-alone" applications). As such, the memory 82 is configured with a speech recognition and synthesis module 94 to convert speech input from the user 64 into machine readable input, as well as play a speech dialog for the user 64 (e.g., such as a voice prompt). Moreover, the memory 82 is configured with a library 96 configured to store a plurality of speech dialogs to play for the user 64 and/or to store at least one speech input template utilized by the speech recognition and synthesis module 94 to convert speech input of the user 64 into machine readable input (e.g., a "vocabulary"). The memory further includes a data store 98 to store data related to the mobile device 60, headset 62, and/or user 64.

In some embodiments, a suitable mobile device 60 for implementing the present invention is a Talkman® wearable computer available from Vocollect, Inc., of Pittsburgh, Pa. The mobile device 60 is a voice-driven system, which uses speech recognition technology for documentation and/or communication. The headset 62 provides hands-free voice communication between the user 64 and the mobile device 60. For example, in one embodiment, the mobile device 60 receives a comma delimited string from the protocol translator 14 and converts it into voice prompts, which are provided to the user 64 through the headset 62. The user 64 may reply, via speech input, which is converted to a useable digital format (e.g., machine readable input) stored in the mobile device 60 and transferred, in a message, back to the protocol translator 14.

Figure 5:
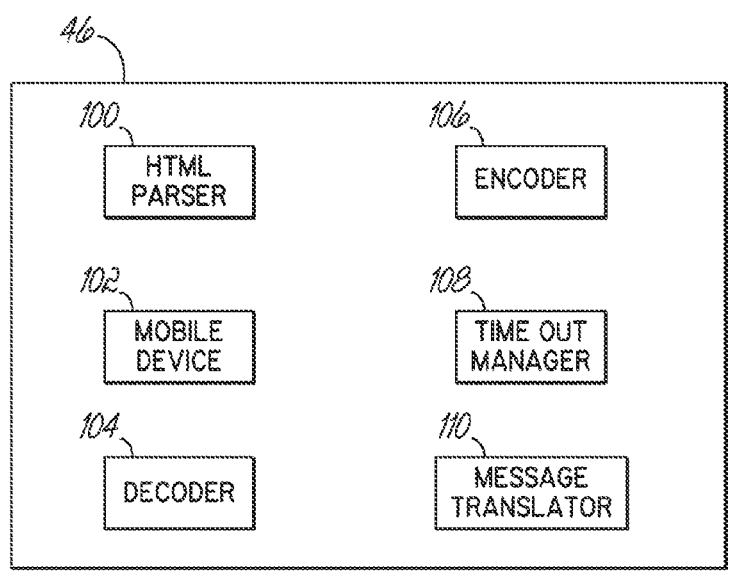
FIG. 5 is a diagrammatic illustration of a plurality of software modules that may be included in the protocol translator of FIG. 1.

FIG. 5 is a diagrammatic illustration of a plurality of applications, sequences of operations, components, programs, files, objects, modules, etc., that may be included in the protocol translator application 46 of FIG. 2. In some embodiments, the protocol translator application 46 includes an HTML parser 100, a mobile device communication module 102, a decoder 104, an encoder 106, a time out manager 108, and/or a message translator 110. As such, and in some embodiments, the HTML parser 100 is configured to parse a web page for HTML components by determining the tags associated with each component (e.g., HTML tags). The HTML parser 100 is further configured to determine a unique identifier associated with the web page and determine, from a voice attribute file associated with the web page, which HTML components to convert to parameterized components. Specifically, the HTML parser 100 is configured to determine which HTML components to transform to parameterized components by determining whether the respective voice attribute file indicates that those HTML components are to be transformed (e.g., whether those HTML components are "enabled"). The encoder 106 is configured to transform each enabled HTML component into a parameterized component as well as to encode parameterized components into the comma delimited string, while the mobile device communication module 102 is configured to provide the comma delimited string to the mobile device 60. The mobile device communication module 102 is also configured to receive messages from the mobile device 60, which are then decoded by the decoder 104 and translated to a format compatible with the ITS 12 by the message translator 110. The time out manager 108 is configured to determine if a message to the mobile device 60 has timed out and alert a user and/or component of the protocol translator 14 or log the error in the log data structure 50. The modules 102-110 may also be configured to log errors, faults, or respective error-free operations in the log data structure 50.

In specific embodiments, each voice attribute file is configured to include a plurality of voice attribute components, each of which is used to generate a parameterized component, at least some of which are associated with corresponding HTML components of a web page. The voice attribute file is thus configured to control the voice prompts and/or voice interactions associated with a particular web page. As such, transformation of an HTML component, such as a user interface component, to a voice interactable form is performed at the protocol translator 14, if at all. Each voice attribute file is stored in the voice attribute file data structure 48 and includes a plurality of voice attribute components, at least some of which are associated with HTML components of a web page, each voice attribute component including at least some of the following properties as described in Table 1 below:

TABLE 1

Properties of a Voice Attribute Component of Voice Attribute File

| NAME | VALUES | DESCRIPTION |
| --- | --- | --- |
| Class | String/Integer | Identifies the particular web page with which the voice attribute file is associated. May include a template identifier or at least a portion of a URL associated with a web page. |
| Enabled | Integer | Enables the conversion of the HTML component into a parameterized component.<br>0: Never send the specified parameterized component to the mobile device.<br>1: Always send the specified parameterized component to the mobile device.<br>2: Send the specified parameterized component if a corresponding HTML component is present in the web page, but don't send otherwise. |
| Field ID | String/Integer | Specifies a field ID for the parameterized component. Configured to match a field ID of the corresponding HTML component. |
| Field Name | String/Integer | Optional. Specifies a name for a particular HTML component and may be pulled from the HTML component. |
| Field Value | String/Integer | Optional. Specifies a value for a particular HTML component and may be pulled from the HTML component. This can be compared to later values to confirm an operation or this value can be spoken to a user. |
| Command | String/Integer | Assigns the parameterized component a command. As an example, the command may be "Help." The user may speak "Help" to hear help information about the web page. As another example, the command may be "Button." The user may interact with a particular HTML button component associated with the voice attribute file by speaking "Sign Off," which is the response to select the particular HTML button component. |
| Group | String/Integer | Assigns the parameterized component to a particular group to allow for control of the workflow and to determine when vocabulary and button commands are available to a user. Parameterized components with lower numbers are converted to voice prompts first. |
| Sequence | String/Integer | Assigns the parameterized component a particular order in a group to allow for control of the workflow within a grouping of commands. Parameterized components with lower numbers are converted to voice prompts first. |
| Vocab Word | String/Integer | Specifies the vocabulary word to provide to the mobile system. As an example, the vocabulary word assigned to a button can include "details." When the user says "Details," the system interprets this as interfacing with that button (e.g., pressing and/or selecting the button). As another example, the vocabulary word can be associated with specific information, such as to allow a user to request a particular piece of information, such as "Material Number." |

TABLE 1-continued

Properties of a Voice Attribute Component of Voice Attribute File

| NAME | VALUES | DESCRIPTION |
|---|---|---|
| Pre-Prompt | String/Integer | Optional. Assigns a pre-prompt to the parameterized component. As an example, a parameterized component for a voice prompt may specify to "Go to the 'Freezer' section, then say 'Ready.'" The pre-prompt for this voice prompt is "Go to the." |
| Prompt | String/Integer | Optional. Assigns a prompt to the parameterized component. As an example, a parameterized component for a voice prompt may specify to "Go to the 'Freezer' section, then say 'Ready.'" The prompt for this voice prompt is "section." In this example, "Freezer" is specified by the Field Value, which may, in turn, be scraped from the web page. |
| Post-Prompt | String/Integer | Optional. Assigns a post-prompt to the parameterized component. As an example, a parameterized component for a voice prompt may specify to "Go to the 'Freezer' section, then say 'Ready.'" The post-prompt for this voice prompt is "then say 'Ready.'" |
| Validate Pre-Prompt | String/Integer | Optional. Assigns a pre-prompt for a validation voice prompt. As an example, a parameterized component for a validation voice prompt may specify "Wrong three, try again." The validation pre-prompt is "Wrong." |
| Validate Post-Prompt | String/Integer | Optional. Assigns a post-prompt for a validation voice prompt. As an example, a parameterized component for a validation voice prompt may specify "Wrong three, try again." The validation post-prompt is "try again." |
| Confirm Spoken Value Pre-Prompt | String/Integer | Optional. Confirms speech input of a user. As an example, a parameterized component for a confirmation voice prompt may confirm speech input by responding "You said 'new function,' correct?" in response to a user saying "New Function." The pre-prompt for this voice prompt may be "You said." |
| Confirm Spoken Value Post-Prompt | String/Integer | Optional. Confirms speech input of a user. As an example, a parameterized component for a confirmation voice prompt may confirm speech input by responding "You said 'new function,' correct?" in response to a user saying "New Function." The post-prompt for this voice prompt may be "correct?" |
| Field Description | String | Optional. Description of a particular component. |
| Post Button | String/Integer | Optional. Specifies a button to select after collecting information from a user. |
| Validate | Boolean | Optional. Specifies whether to validate information from the user against what was sent from the protocol translator. For example, if user provides a speech input of "three," the system (mobile system or protocol translator) will not validate that number if this property is not active. |
| Validate Priority Prompt | Boolean | Optional. Specifies whether the user can speak over a validation voice prompt when the user is attempting to reply to the validation voice prompt. |
| Confirm Spoken Value | Boolean | Optional. Specifies whether to confirm speech input of user. For example, if the user provides a speech input of "New Function," the system validates that by responding with a voice prompt specifying "You said 'New Function,' correct?" if this property is active. |
| Speak Value | Boolean | Optional. Specifies whether to speak a value from the protocol translator back to the user. |
| Ready | Boolean | Optional. Specifies whether to require the user to say 'Ready' after providing a speech input. |
| UOM | Boolean | Optional. Specifies to the protocol that this particular voice attribute component is a unit of measure. As such, the protocol translator translates the HTML component As an example, kilograms, pounds, liters, single units, cases of units, etc. |
| Description | String | Optional. Description associated with parameterized component. User can request more information about a voice prompt if this property is active. |
| Min Length | Integer | Optional. Specifies min number of digits for a value to be entered. Zero is default and specifies no min length. |

TABLE 1-continued

Properties of a Voice Attribute Component of Voice Attribute File

| NAME | VALUES | DESCRIPTION |
| --- | --- | --- |
| Max Length | Integer | Optional. Specifies max number of digits for a value to be entered. Zero is default and specifies no max length. |

Thus, the voice attribute file specifies various options with each HTML component of a web page, including whether that HTML component is even associated with a parameterized component. Moreover, the voice attribute file can specify various options for parameterized components that are not associated with HTML components of a web page. In this manner, the protocol translator 14 can specify a plurality of parameterized components, and a plurality of voice prompts, for each web page, whether those parameterized components and/or voice prompts are associated with HTML components or not. In some embodiments, the mobile system 16 is configured to indicate to the protocol translator 14 the language for which that mobile system 16 is configured. As such, the protocol translator 14 indicates, with each parameterized component, the language associated with the mobile system 16 for which that parameterized component is intended. In this manner, the protocol translator 14 is configured to provide voice prompts in a number of languages consistent with embodiments of the invention. When the protocol translator 14 is not aware of a language for a mobile system 16, such as at an initial configuration, the default language indicated in a parameterized component is English.

As discussed above, the protocol translator 14 is further configured to receive messages from the mobile system 16 and convert them to a URL to send to the ITS 12. For example, the user may respond to select a second menu option by saying "Two," thus selecting to continue to the next selected menu. The mobile system 16 converts that into machine readable input and provides the machine readable input to the protocol translator 14. In particular, the protocol translator 14 may receive the following comma delimited message that includes the machine readable input specifying that the user said "Two":

"Post","Tue Sep 10 12:55:55 EDT 2009","987654321", "abmtest","EN","http://10.0.13.186:80 02/sap (cz1tsme9jueiit3jwlu5n"," ","rlmob-menopt[1]","2", "~OKCode","NEXT"," "

In turn, the protocol translator 14 parses the message to determine a URL to send to the ITS 12 that includes the indication of a particular web page that the speech input is associated with (e.g., "http://10.0.13.186:8002/sap (cz1tsme9jueiit3jwlu5n"), the particular component of the web page that the speech input is associated with (e.g., a menu option "rlmob-menopt[1]"), the particular speech input (e.g., "2"), and the action to take with regard to that menu option (e.g., the selection of that second menu item, which triggers movement to a next page associated with that menu option, or an "~OKCode" specifying "NEXT"). As such, the protocol translator 14 may provide the following URL to the ITS 12 that specifies a new web page for the ITS 12 to navigate to in response to user interaction therewith:

http://10.0.13.186:8002/sap
(cz1tsme9jueiit3jwlu5n?rlmob-menopt[1]=
2&~OKCode=NEXT)

In this manner, the protocol translator 14 is configured to both provide parameterized components to the mobile system 16 for the mobile system 16 to convert to speech dialog as well as provide URLs to the ITS 12 to allow voice directed and/or voice assisted user navigation through a web page, and in particular a web page associated with a workflow. The protocol translator 14 does so without reconfiguring the input for the web page through the use of voice attribute files that in turn can be manipulated to update the selective scraping of their respective web pages.

A person having ordinary skill in the art will recognize that the environments illustrated in FIGS. 1-5 are not intended to limit the scope of embodiments of the invention. In particular, system 10, ITS 12, protocol translator 14, and mobile system 16 may include fewer or additional components consistent with alternative embodiments of the invention. Indeed, a person having skill in the art will recognize that other alternative hardware and/or software environments may be used without departing from the scope of the invention. For example, the protocol translator application 46 may be configured with fewer or additional modules, while the mass storage 34 may be configured with fewer or additional data structures. Additionally, a person having ordinary skill in the art will appreciate that the protocol translator 14 and/or mobile device 60 may include more or fewer applications disposed therein. As such, other alternative hardware and software environments may be used without departing from the scope of embodiments of the invention.

Moreover, a person having ordinary skill in the art will appreciate that the terminology used to describe various pieces of data, such as HTML component, parameterized component, comma delimited string, voice prompt, comma delimited message, speech dialog, and speech input are merely used for differentiation purposes and not intended to be limiting.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system (e.g., the protocol translator 12 and/or mobile device 60), and that, when read and executed by one or more processors of the computing system, cause that computing system to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 6:
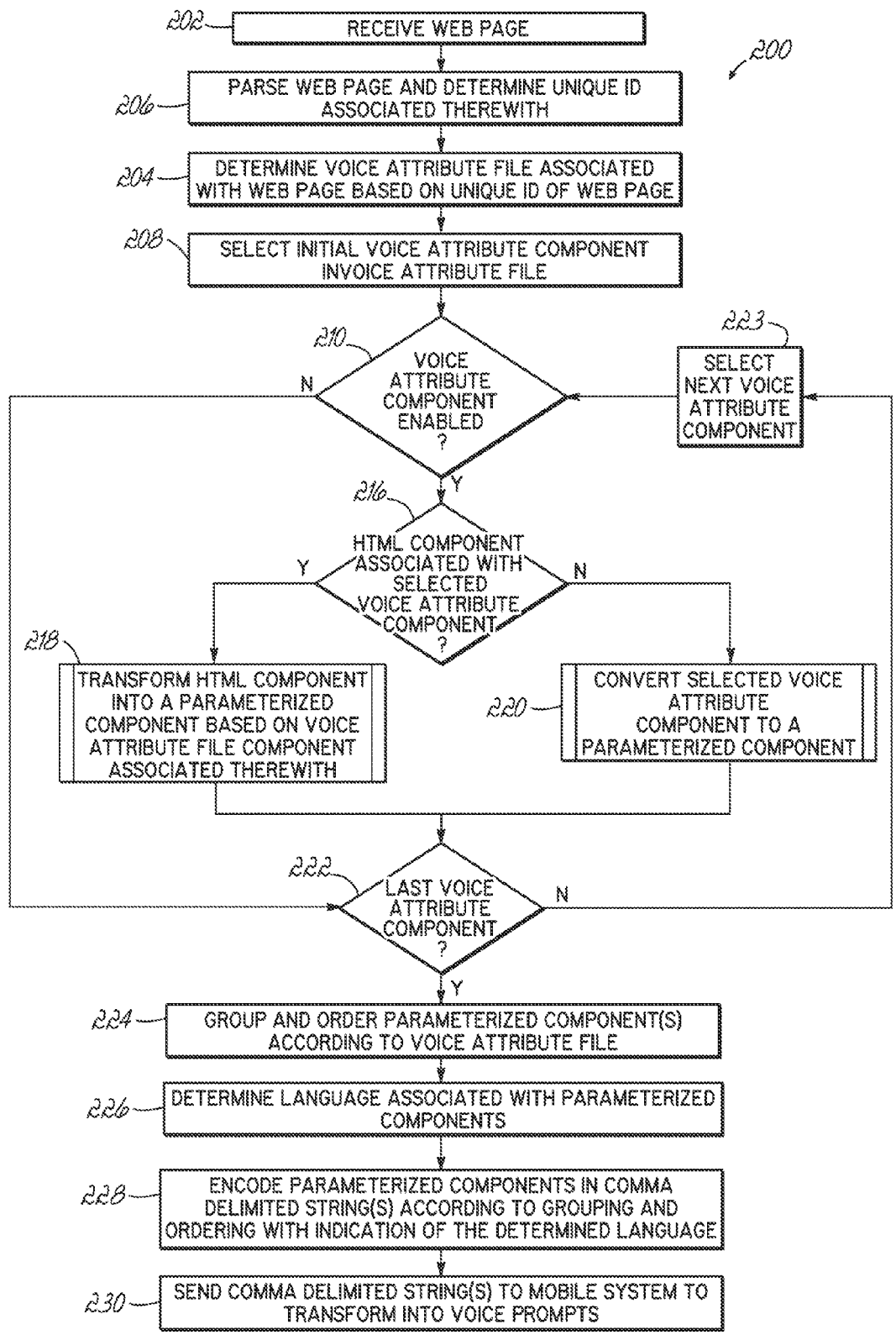
FIG. 6 is a flowchart illustrating a sequence of operations to generate parameterized components for the mobile system of FIG. 1 to play as voice prompts.

FIG. 6 is flowchart 200 illustrating a sequence of operations executed by a computing system to determine which HTML components associated with a web page to transform into parameterized components for a mobile system and transforming the same consistent with embodiments of the invention. Specifically, a computing system, such as that configured with a protocol translator application, receives a web page (block 202). The HTML of the web page is then parsed and a unique identifier associated with the web page is determined (block 204). In some embodiments, the HTML code of the web page is parsed to determine each HTML tag set (e.g., matching opening and closing tabs), and thus each HTML component (button, text field, table, field thereof, selectable link, etc.) of the web page. As such, a voice attribute file associated with the web page is determined based on unique identifier of the web page (block 206). In response to determining the voice attribute file associated with the web page, voice attribute components (e.g., individual instructions for each parameterized component, whether that parameterized component is associated with an HTML component or not) are also determined and the initial voice attribute component of the voice attribute file is selected (block 208). The program code then determines whether the voice attribute component is enabled (e.g., whether a parameterized component is to be generated from that voice attribute component) (block 210). When the voice attribute component is enabled ("Yes" branch of decision block 210) the program code determines whether there is an HTML component associated with the voice attribute component (block 216).

In some embodiments, the program code is configured to transform HTML components of a web page to parameterized components. As such, one or more HTML components of a web page may not be converted while others are not. As such, the program code determines whether an HTML component is associated with the selected voice attribute component (block 216). In particular, the program code determines an identifier associated with the voice attribute component matches a unique identifier of an HTML component in block 216. Thus, when an HTML component is associated with the selected voice attribute component ("Yes" branch of decision block 216) the program code copies at least a portion of the data associated with that HTML component, converts that data to XML, and generates a parameterized component from the data associated with the HTML component and data from the selected voice attribute component (block 218).

In some embodiments, in addition to scraping a web page, the program code is configured to generated parameterized components that are not associated with corresponding HTML components. For example, the program code may be configured to provide help options to the mobile system that are not present on a web page with which those help options are associated. As such, a voice attribute component of a voice attribute file associated with the web page, but otherwise not associated with an HTML component of the web page, may be utilized to generate a parameterized component for the mobile system. Thus, and returning to block 216, when an HTML component is associated with the selected voice attribute component ("No" branch of decision block 216) the selected voice attribute component is converted into a parameterized component (block 220). In response to determining that the voice attribute component is not enabled ("No" branch of decision block 210), in response to transforming an HTML component into a parameterized component (block 218), or in response to converting a selected voice attribute component into a parameterized component (block 220), the program code determines whether the last voice attribute component of the voice attribute file has been reached (block 222). When the last voice attribute component has not been reached ("No" branch of decision block 222) the next voice attribute component is selected (block 223) and the sequence of operations proceeds to again determine whether the selected voice attribute component is enabled (block 210). When the last voice attribute component has been reached ("Yes" branch of decision block 222) parameterized components are grouped and ordered according to their respective voice attribute components (block 224).

In response to grouping and ordering parameterized components, a language associated with each of the parameterized components is determined (block 226) and the parameterized components are encoded into at least one comma delimited strings according to their grouping and ordering along with an indication of the determined language for the parameterized components (block 228). The program code then sends the at least one comma delimited string for the mobile system to transform into voice prompts (block 230).

Figure 7:
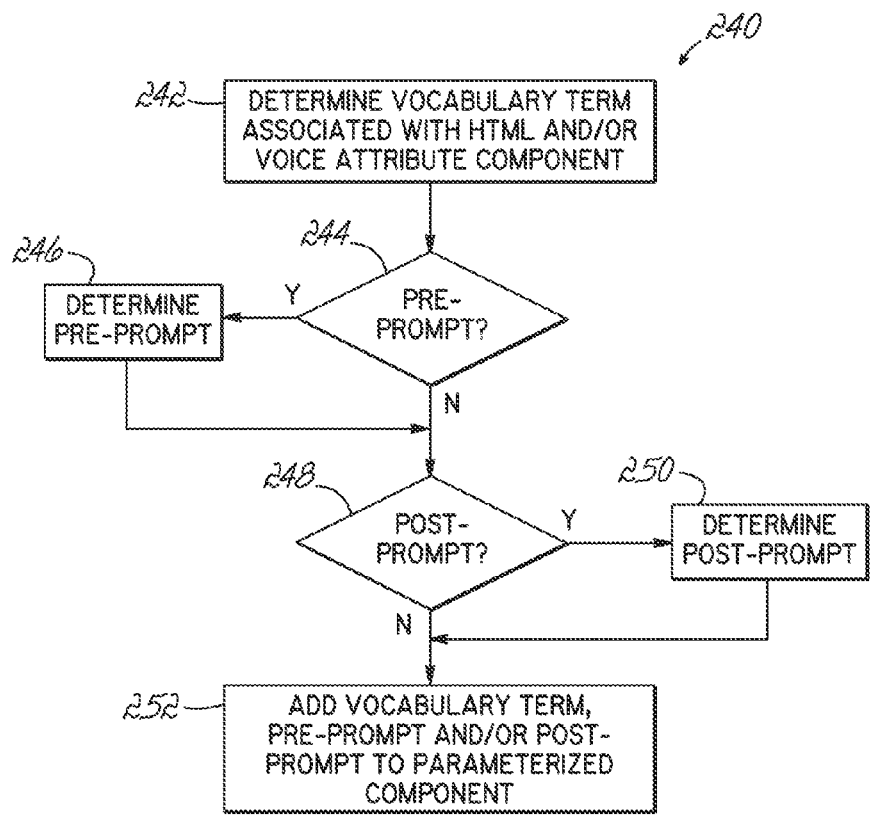
FIG. 7 is a flowchart illustrating a sequence of operations to determine and configure the text for a parameterized component for the mobile system of FIG. 1 to play a voice prompt.

FIG. 7 is a flowchart 240 illustrating a sequence of operations executed by a computing system to determine and configure a parameterized component for a mobile system based on a voice attribute file consistent with embodiments of the invention. Specifically, the sequence of operations of FIG. 7 may be executed during the conversion of an HTML component into a parameterized component as illustrated in blocks 218 of FIG. 6. Returning to FIG. 7, a vocabulary term associated with an HTML component and/or a voice attribute component in turn associated with that HTML component to configure in a parameterized component is determined (block 242). The program code then determines whether a pre-prompt associated with the HTML component and/or the voice attribute component associated therewith is enabled (block 244). A pre-prompt is a portion of voice prompt that indicates to the user information that may be useful to interact with the web page. For example, the pre-prompt may indicate to "Say 'yes' or 'no'" or otherwise indicate context for the particular HTML component with which that pre-prompt is associated. Thus, when the voice attribute component indicates that a pre-prompt is enabled, the program code determines that a pre-prompt is associated with the HTML component ("Yes" branch of decision block 244) and determines the pre-prompt to add to the parameterized component (block 246).

In response to determining that a pre-prompt is not enabled ("No" branch of decision block 244) or in response to determining the pre-prompt to add to the parameterized component (block 246), the program code determines if a post-prompt associated with the HTML component and/or the voice attribute component is enabled (block 248). Similarly to the pre-prompt, the post-prompt also indicates context for the particular HTML component and/or voice attribute component with which that post-prompt is associated. Thus, when the program code determines that a post-prompt is enabled ("Yes" branch of decision block 248) the program code determines a post-prompt to add to the parameterized component (block 250). In response to determining that a post-prompt is not enabled ("No" branch of decision block 248) or in response to determining a post-prompt to add to the parameterized component (block 250), the program code adds the vocabulary term, the pre-prompt, and/or the post-prompt to the parameterized component (block 252).

Figure 8:
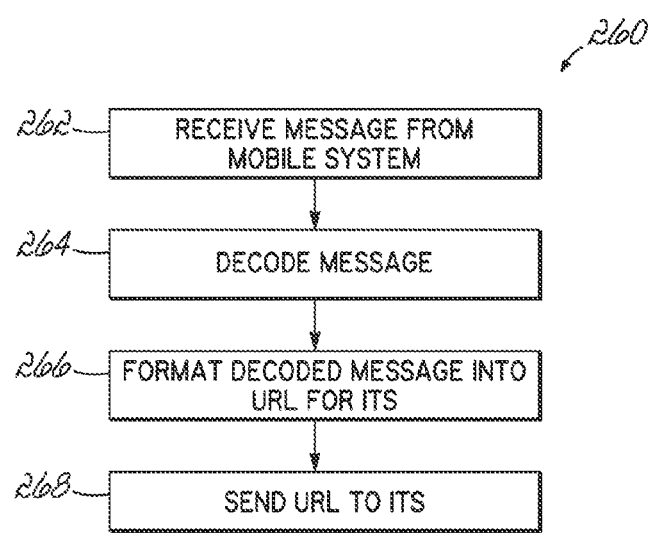
FIG. 8 is a flowchart illustrating a sequence of operations for the protocol translator of FIG. 1 to receive and decode a message from the mobile system of and supply to the internet transaction server of to implement voice interaction with a web page.

FIG. 8 is a flowchart 260 illustrating a sequence of operations to receive a message from a mobile system, decode that message into a URL, and send that URL to an ITS consistent with embodiments of the invention. In some embodiments, a protocol translator receives a message from a mobile system, and in particular a mobile device of the mobile system (block 262). The protocol translator then decodes this message (block 264) and formats the decoded message into a URL for an ITS (block 266). For example, the message may contain a portion of a URL as well as data that can be formatted to add to the URL to interact with a web page. The protocol translator thus receives this message and formats it into a URL that can be subsequently provided to the ITS. Once the message is formatted into a URL for the ITS (block 266) the URL is provided to the ITS (block 268) for the ITS to act accordingly.

Thus, the voice attribute files are associated with particular web pages, while at least some of the voice attribute components of the voice attribute files are associated with respective HTML components of the web pages. In turn, each voice attribute defines the voice interactability for each web page. As such, attributes for a particular web page can be configured on a web-page-by-web-page basis to control interactions of a user of a mobile system with that particular web page. Moreover, configuration of these attributes are controlled by changing the voice attribute components, or particular properties thereof, of the voice attribute files rather than changing web pages or protocol systems. In specific embodiments, the voice attribute files are XML-based and can be changed through a text-based editing software. Advantageously, this allows any web page, and the components thereof, to be transformed to voice prompts without knowledge of business logic or process logic, or specialized knowledge of the protocol translator or mobile system, by configuring a voice attribute file associated therewith. One having ordinary skill in the art will appreciate that alternatively formatted voice attribute files may be used, including voice attribute files that are incorporated into a database, a program, or other format well known in the art.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, apparatuses, and methods shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the scope of applicants' general inventive concept.

The invention claimed is:

1. A method of converting components of a web page, having a plurality of HTML components, to voice prompts for a user, comprising:
   using an identifier and selecting a voice attribute file from a plurality of existing voice attribute files to be associated with a particular web page, the voice attribute file containing a plurality of voice attribute components that may be selectively enabled, the enabled voice attribute components in the selected voice attribute file determining which specific HTML components of the plurality of HTML components of a web page associated with the file are to be transformed for voice prompts;
   selecting a voice attribute component;
   determining whether the selected voice attribute component is enabled;
   in response to a determination that the selected voice attribute component is enabled, determining whether an HTML component of the plurality of HTML components is associated with the selected voice attribute component;
   in response to a determination that an HTML component of the plurality of HTML components is not associated with the selected voice attribute component, converting the selected voice attribute component to a parameterized component; and
   forwarding the parameterized component to a mobile system, the mobile system configured to play a speech dialog using voice prompts based upon the parameterized component.

2. The method of claim 1, wherein selecting the voice attribute file comprises:
   determining an identifier associated with the web page; and
   determining an identifier associated with the voice attribute file, wherein the voice attribute file is selected in response to determining that the identifier associated with the web page matches the identifier associated with the voice attribute file.

3. The method of claim 1, comprising:
   selecting a second voice attribute component from the plurality of voice attribute components; and
   determining whether the second voice attribute component is enabled.

4. The method of claim 1, comprising:
   selecting a second voice attribute component from the plurality of voice attribute components;
   determining whether the second voice attribute component is enabled; and
   in response to a determination that the second voice attribute component is enabled, determining whether an HTML component of the plurality of HTML components is associated with the second voice attribute component.

5. The method of claim 1, comprising:
   selecting a second voice attribute component from the plurality of voice attribute components;
   determining whether the second voice attribute component is enabled;
   in response to a determination that the second voice attribute component is enabled, determining whether an HTML component of the plurality of HTML components is associated with the second voice attribute component; and in response to a determination that an HTML component of the plurality of HTML components is associated with the second voice attribute component, converting the HTML component associated with the second voice attribute component to a second parameterized component.

6. The method of claim 1, comprising associating a group identifier to the parameterized component based upon the enabled voice attribute component.

7. The method of claim 1, comprising:
associating a group identifier to the parameterized component based upon the enabled voice attribute component; and
associating a sequence identifier within the group identifier to the parameterized component based upon the enabled voice attribute component.

8. The method of claim 1, comprising:
receiving, from the mobile system, an indication of a language associated with the mobile system; and
associating the parameterized component with the indicated language.

9. The method of claim 1, comprising receiving the web page from an internet transaction server.

10. The method of claim 1, comprising:
receiving a message from the mobile system;
generating, based upon the message, a uniform resource locator to invoke a request for a second web page; and
sending the uniform resource locator to an internet transaction server.

11. The method of claim 1, wherein forwarding the parameterized component to the mobile system comprises:
configuring the parameterized component in a comma delimited string; and
forwarding the comma delimited string to the mobile system.

12. A method of converting components of a web page, having a plurality of HTML components, to voice prompts for a user, comprising:
using an identifier and selecting a voice attribute file from a plurality of existing voice attribute files to be associated with a particular web page, the voice attribute file containing a plurality of voice attribute components that may be selectively enabled, the enabled voice attribute components in the selected voice attribute file determining which specific HTML components of the plurality of HTML components of a web page associated with the file are to be transformed for voice prompts;
selecting a voice attribute component;
determining whether the selected voice attribute component is enabled;
in response to a determination that the selected voice attribute component is enabled, determining whether an HTML component of the plurality of HTML components is associated with the selected voice attribute component;
determining whether a pre-prompt associated with the HTML component and/or the selected voice attribute component is enabled;
in response to a determination that a pre-prompt associated with the HTML component and/or the selected voice attribute component is enabled, adding the pre-prompt to a parameterized component; and
forwarding the parameterized component to a mobile system, the mobile system configured to play a speech dialog using voice prompts based upon the parameterized component.

13. The method of claim 12, wherein the pre-prompt indicates to a user a context for the HTML component with which the pre-prompt is associated.

14. The method of claim 12, wherein the pre-prompt prompts a user with a particular phrase.

15. The method of claim 12, comprising:
determining a vocabulary term associated with the HTML component and/or the selected voice attribute component; and
adding the determined vocabulary term to the parameterized component.

16. The method of claim 12, comprising:
selecting a second voice attribute component from the plurality of voice attribute components;
determining whether the second voice attribute component is enabled;
in response to a determination that the second voice attribute component is enabled, determining whether an HTML component of the plurality of HTML components is associated with the second voice attribute component; and
in response to a determination that an HTML component of the plurality of HTML components is associated with the second voice attribute component, converting the HTML component associated with the second voice attribute component to a second parameterized component.

17. A method of converting components of a web page, having a plurality of HTML components, to voice prompts for a user, comprising:
using an identifier and selecting a voice attribute file from a plurality of existing voice attribute files to be associated with a particular web page, the voice attribute file containing a plurality of voice attribute components that may be selectively enabled, the enabled voice attribute components in the selected voice attribute file determining which specific HTML components of the plurality of HTML components of a web page associated with the file are to be transformed for voice prompts;
selecting a voice attribute component;
determining whether the selected voice attribute component is enabled;
in response to a determination that the selected voice attribute component is enabled, determining whether an HTML component of the plurality of HTML components is associated with the selected voice attribute component;
determining whether a post-prompt associated with the HTML component and/or the selected voice attribute component is enabled;
in response to a determination that a post-prompt associated with the HTML component and/or the selected voice attribute component is enabled, adding the post-prompt to a parameterized component; and
forwarding the parameterized component to a mobile system, the mobile system configured to play a speech dialog using voice prompts based upon the parameterized component.

18. The method of claim 17, wherein the post-prompt indicates to a user a context for the HTML component with which the post-prompt is associated.

19. The method of claim 17, wherein the post-prompt prompts a user with a particular phrase.

20. The method of claim 17, comprising:
determining a vocabulary term associated with the HTML component and/or the selected voice attribute component; and
adding the determined vocabulary term to the parameterized component.

* * * * *